(12) United States Patent
Blaimschein et al.

(10) Patent No.: US 6,308,552 B1
(45) Date of Patent: Oct. 30, 2001

(54) FORGING MACHINE

(75) Inventors: Gottfried Blaimschein, Steyr; Alfred Seeber, Garsten/Steyr, both of (AT)

(73) Assignee: GFM Betteiligungs- und Management GmbH & Co. KG, Steyr (AT)

( * ) Notice: Subject to any disclaimer, the term of this patent is extended or adjusted under 35 U.S.C. 154(b) by 0 days.

(21) Appl. No.: 09/452,994

(22) Filed: Dec. 2, 1999

(30) Foreign Application Priority Data

Dec. 9, 1998 (AT) .................................................. 2060/98

(51) Int. Cl.[7] ............................... B21D 41/00; B21J 9/18
(52) U.S. Cl. ............................................. 72/452.5; 72/402
(58) Field of Search .............................. 72/452.5, 452.6, 72/403, 402

(56) References Cited

U.S. PATENT DOCUMENTS

| | | | |
|---|---|---|---|
| 3,572,077 | * | 3/1971 | Kralowetz ........................... 72/452.5 |
| 3,621,702 | * | 11/1971 | Kralowetz ........................... 72/452.5 |
| 3,837,210 | * | 9/1974 | Kralowetz ............................. 72/403 |
| 3,871,223 | * | 3/1975 | Kralowetz et al. .................... 72/402 |
| 3,889,514 | * | 6/1975 | Kralowetz et al. .................... 72/402 |
| 4,430,881 | * | 2/1984 | Kralowetz ............................. 72/402 |
| 4,435,143 | * | 3/1984 | Dempsey ........................... 72/452.5 |
| 4,464,924 | * | 8/1984 | Kralowetz ........................... 72/452.5 |
| 4,497,195 | * | 2/1985 | Kralowetz ............................. 72/402 |

FOREIGN PATENT DOCUMENTS

| | | |
|---|---|---|
| 370 351 | 3/1983 | (AT) . |
| 24 11 340 | 9/1975 | (DE) . |
| 0 667 197 A1 | 8/1995 | (EP) . |

* cited by examiner

Primary Examiner—David Jones
(74) Attorney, Agent, or Firm—Collard & Roe, P.C.

(57) ABSTRACT

A forging machine (1) comprises eccentric-driven connecting rods (6), which are vertically movably guided in a forging box (3) radial to the eccentric shaft axis (E), and for a drive connection have a connecting rod small end (12) with a sliding surface at their end facing the eccentric for a non-rotating sliding cooperation with a bearing body (13) rotatably seated at the eccentric (11). To achieve a rugged and nevertheless simple adjustment of the vertical position, the sliding surface (20) of the connecting rod small end (12) forms a sliding path (G) normal to the axial plane defined by the eccentric shaft axis (E) and the connecting rod axis (P) and inclined with respect to the eccentric shaft axis (E), and via an actuator (22) the bearing body (13) forming a corresponding inclined surface (21) is movably arranged relative to the connecting rod (6) firmly supported in the direction of the eccentric shaft axis.

5 Claims, 6 Drawing Sheets

FORGING MACHINE

FIELD OF THE INVENTION

This invention relates to a forging machine with eccentric-driven connecting rods, which are guided in a forging box so as to be reciprocable in a radial direction relative to the eccentric shaft axis, and an eccentric drive connection including a head at the connecting rod end with a sliding surface facing the eccentric for a non-rotating sliding cooperation with a bearing body rotatably seated on the eccentric.

DESCRIPTION OF THE PRIOR ART

Forging machines with eccentric-driven connecting rods have turned out to be very useful in all kinds of embodiments, but for adjusting the stroke of the connecting rods special adjustment housings must be provided for supporting the eccentric shaft. This weakens the rigidity of the machine frame due to the required bearing lugs, and due to the displacement of the center of the eccentric shaft during the adjustment, a corresponding eccentric shaft drive compensating this displacement is required. It has also been proposed that for adjusting the stroke of the connecting rods to compose them of two parts screwed together, one part being non-rotatably guided with respect to the forging box and the other rotatably guided. The rotatable part is connected to a rotary drive, so that a rotation of the rotatable part effects a change in the length of the connecting rod and thus an adjustment of the stroke. However, this means for adjusting the stroke still remains rather complex and impairs the load-bearing capacity of the connecting rods due to their division.

SUMMARY OF THE INVENTION

It is, therefore, the object of the present invention to create a forging machine as described above, which is characterized by its particularly simple and rugged means for adjusting the stroke.

This object is solved by the invention with a forging machine comprising a forging box, a plurality of connecting rods, each connecting rod having an axis and carrying a forging tool at one end thereof, an eccentric drive for driving each connecting rod in a reciprocating motion. The drive includes a shaft having an axis and comprising an eccentric, the reciprocating motion extending radially to the eccentric shaft axis and the connecting rod being supported against axial displacement, a bearing body rotatably and axially displaceably mounted on the eccentric, and a head at an end of the connecting rod opposite to the one end, the bearing body and the connecting rod head having corresponding inclined surfaces in non-rotating and sliding engagement to form a sliding path which is inclined to the axis of the shaft and extends in a plane extending perpendicularly to a plane defined by the axes of the connecting rod and the shaft. An actuator is provided for axially displacing the bearing body. The bearing body and connecting rod, therefore, cooperate like a spline-and-wedge transmission so that an axial displacement of the bearing body due to the resulting relative movement between the inclined surfaces along the sliding path leads to a displacement of the connecting rod in the axial direction of the connecting rod and there is necessarily obtained the desired adjustment of the stroke. The bearing body at the same time serves to effect a drive and operating connection between eccentric shaft and connecting rod, which provides for a compact, high-duty and nevertheless inexpensive construction.

For displacing the bearing bodies, suitable actuators can directly engage the bearing bodies and move the same with respect to the connecting rod and the eccentric. However, the bearing body is advantageously displaceable on the eccentric, and the actuator acts on the axially movable eccentric shaft, so that more favorable mounting conditions are obtained for the actuator.

The inventive adjustment of the stroke similar to a spline-and-wedge transmission can be employed with all eccentric-driven connecting rods, independent of whether the connecting rod head encloses an eccentric and/or the bearing body, i.e., whether there is a unilateral coupling between the connecting rod head and a guide rail of the bearing body in accordance with AT 370,351 B or only a frictional connection between the connecting rod head and the bearing body in accordance with EP 0 667 197 A. When the connecting rod head and a sliding pad seated on the eccentric cooperate in the manner of a cross loop to provide a drive connection, the bearing body can advantageously be a sliding pad received with a transverse clearance in the recess of the connecting rod head forming a connecting link guide, whereby the bearing body at the same time serves as sliding pad of the cross loop and performs a double function in an economic way.

The means for adjusting the stroke in accordance with the invention can not only be used for forging machines with an upright forging box, but also for forging machines employed as rotary kneading machines, where the forging box is mounted in a machine frame so as to be rotated and driven about a forging axis parallel to the eccentric shaft axes. It is particularly advantageous when a common actuator is provided for all eccentric shafts, which comprises a screw drive including an adjusting nut mounted on the forging box coaxially with the forging axis, the adjusting nut being non-rotatable but displaceable and having an entrainment element in non-displaceable but rotatable engagement with the shafts, and a drivable gear rim meshing with the adjusting nut. By rotating the gear rim, the adjusting nut is moved axially, and by means of this movement, the entrainment element can at the same time move the eccentric shafts, which induces a synchronous adjustment of the stroke for all connecting rods.

BRIEF DESCRIPTION OF THE DRAWING

In the drawing, the subject matter of the invention is illustrated schematically.

DESCRIPTION OF THE PREFERRED EMBODIMENTS

Figure 1:
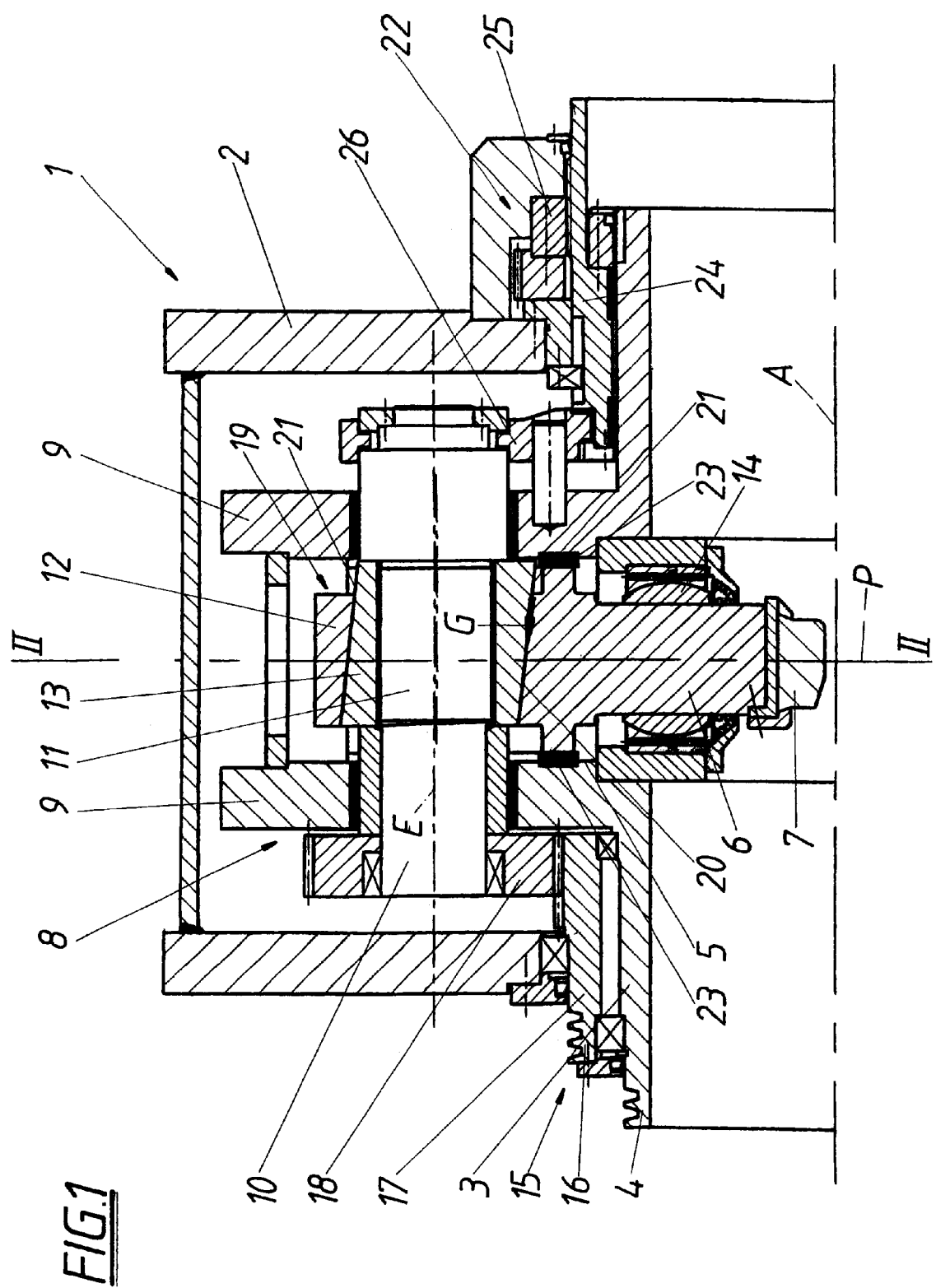
FIGS. 1 and 2 represent one embodiment at the forging machine in an axial section along line I—I of FIG. 2 and in cross-section along line II—II of FIG. 1 on a smaller scale.

A forging machine 1 is comprised of a machine frame 2 in which an annular forging box 3 is rotatably and drivably mounted about a forging axis A. The forging box 3 can be rotated by a drive which is merely indicated by drive wheel 4. The forging box 3 has radial recesses 5 for forging punches 6 acting against each other and reciprocable with a simultaneous rotation of the forging box. The forging punches are equipped with a forging tool 7 at the workpiece end and with an eccentric drive 8 as reciprocating drive at the end facing away from the workpiece. The eccentric drive 8 comprises eccentric shafts 10 with eccentrics 11, which are connected to the forging punches 6 and are mounted in annular walls 9 of the forging box 3. At their end facing the eccentric, the forging punches 6 form a connecting rod head 12, which has a recess for non-rotatingly inserting a bearing body 13 rotatably seated on the eccentric 11. The forging punches 6 are reciprocably movably and pivotally guided in pivot bearing 14, so that during a rotation of the eccentric the forging punches 6 and thus the forging tools 7 are forced to perform a stroke movement radial to the forging axis A and at the same time, a swivel movement with a direction of movement lying in a transverse plane with respect to the forging axis A.

For driving the eccentric shafts 10, there is provided a planetary gear system 15 comprising a sun wheel 17 rotatably mounted at the outer periphery of the forging box 3 and drivable by a pulley 16 and planet wheels 18 associated with the eccentric shafts 10.

Each forging punch 6 is equipped with a stroke adjusting means 19, which is comprised of a sliding path G formed by corresponding inclined sliding surface 21 of bearing body 13 and sliding surfaces 20 of the recess in the connecting rod head 12. The sliding path extends normal to the plane defined by the eccentric shaft axis E and the connecting rod axis P and is inclined with respect to the eccentric shaft axis E. The bearing body 13 is firmly seated on the eccentric 11 and is movable by the eccentric shaft 10, which is engaged by an actuator 22, so that the actuation of the actuator results in a relative movement between bearing body 13 and sliding path G of the connecting rod 6, which is firmly supported against displacement in the direction of the eccentric shaft axis by guiding stops 23. In the manner of a spline-and-wedge transmission, this relative movement effects a change in the position of the connecting rod 6 in the direction of the connecting rod axis P, which involves the desired adjustment of the stroke.

Figure 2:
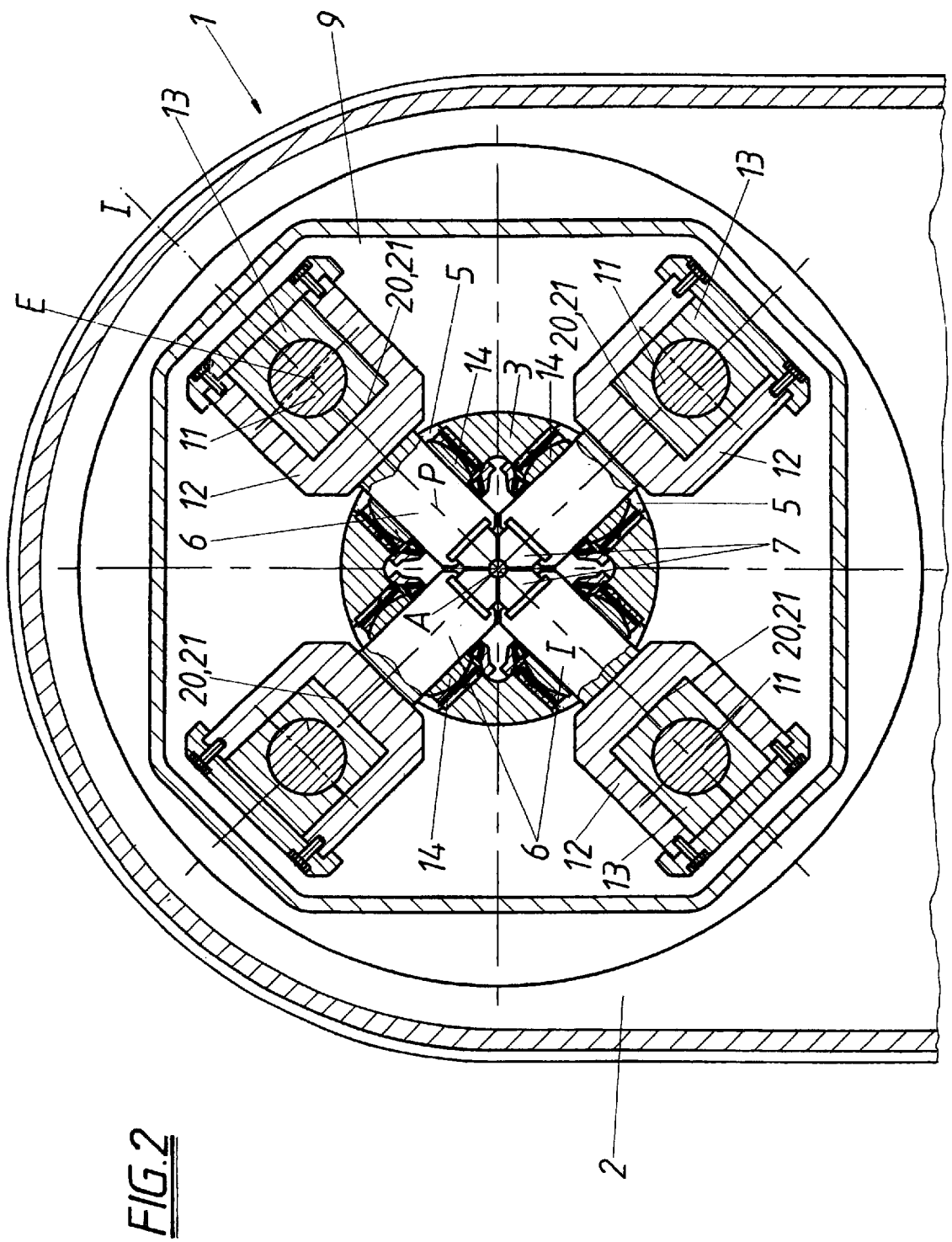
Figure 3:
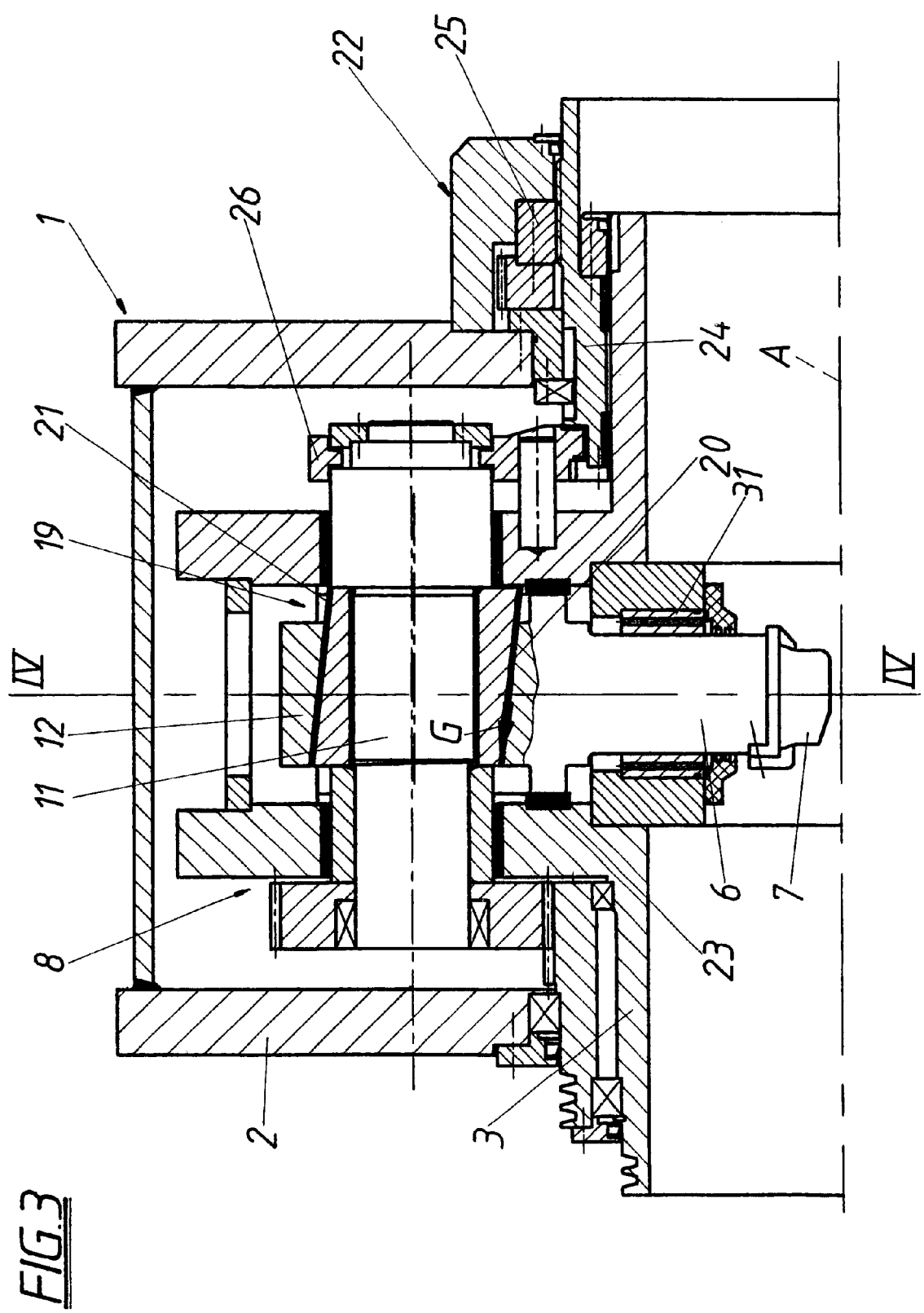
FIGS. 3 and 4 represent another embodiment of the forging machine in an axial section along line III—III of FIG. 4 and in cross-section along line IV—IV of FIG. 3 on a smaller scale.
Figure 4:
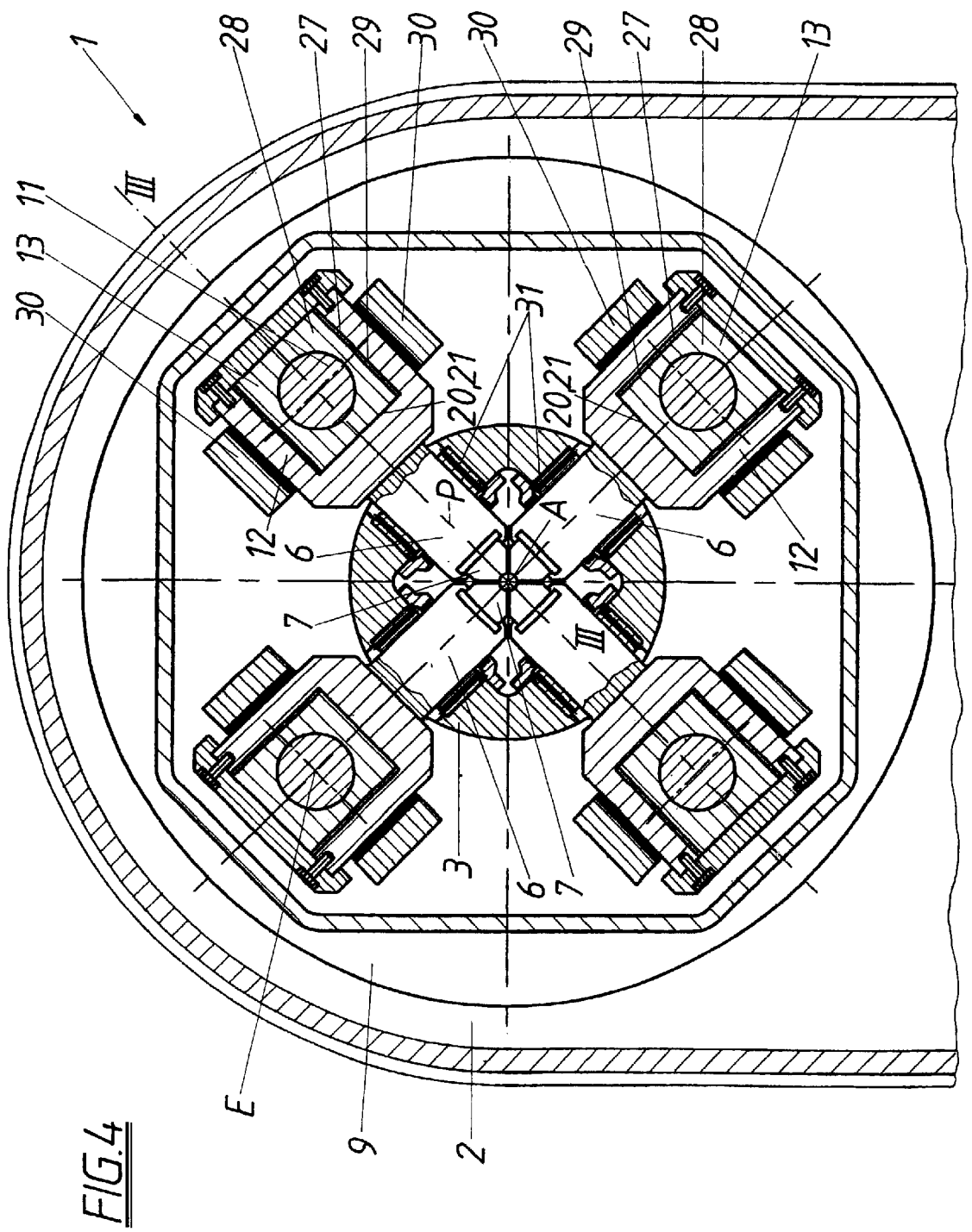

In accordance with the embodiments shown in FIGS. 1 and 2 as well as FIGS. 3 and 4, the actuator 22 comprises a screw drive including an adjusting nut 24 non-rotatably, but movably mounted at the forging box 3 coaxial to the forging axis A and a drivable gear rim 25 meshing with the adjusting nut 24. The adjusting nut 24 has entrainment elements 26 rotatably, but non-displaceably engaging the end of the eccentric shafts 10 facing away from the planet wheels 18. By rotating the gear rim 25, there is thus obtained a displacement of the adjusting nut 24 and thus an axial displacement of the eccentric shafts 10, so that an adjustment of the stroke can be achieved both when the machine is out of operation and when the machine is operating.

FIGS. 3 and 4 illustrate a slightly modified forging machine 1, where the same parts are provided with the same reference numerals. In contrast to the embodiment shown in FIGS. 1 and 2, where the connecting rods are pivotally mounted at the eccentrics, the embodiment shown in FIGS. 3 and 4 has a drive connection in the form of a cross loop between the eccentrics 11 and the connecting rod head 12. The connecting rod head 12 forms a connecting link guide 27 as a support for the bearing body 13, in which connecting link guide the bearing body 13 is inserted as a sliding pad 28 with a transverse clearance 29. As a result, the movement of the eccentric is converted into a pure reciprocating movement, where slide bars 30, 31 ensure the longitudinal guidance of the connecting rods 6 in the forging box 3. For adjusting the stroke, there is also provided a stroke adjusting means 19 including a sliding path G, which is formed of the sliding surfaces 20 of the connecting rod head and associated inclined surfaces 21 of the bearing body 13. The bearing bodies 13 are movable by the actuator 22 together with the eccentric shafts 10 relative to the connecting rods 6 in the direction of the eccentric shaft axis, so that independent of the rotation of the forging box and/or the eccentric shafts, the stroke of the connecting rod 6 and thus the forging tools 7 can be adjusted as desired.

Figure 5:
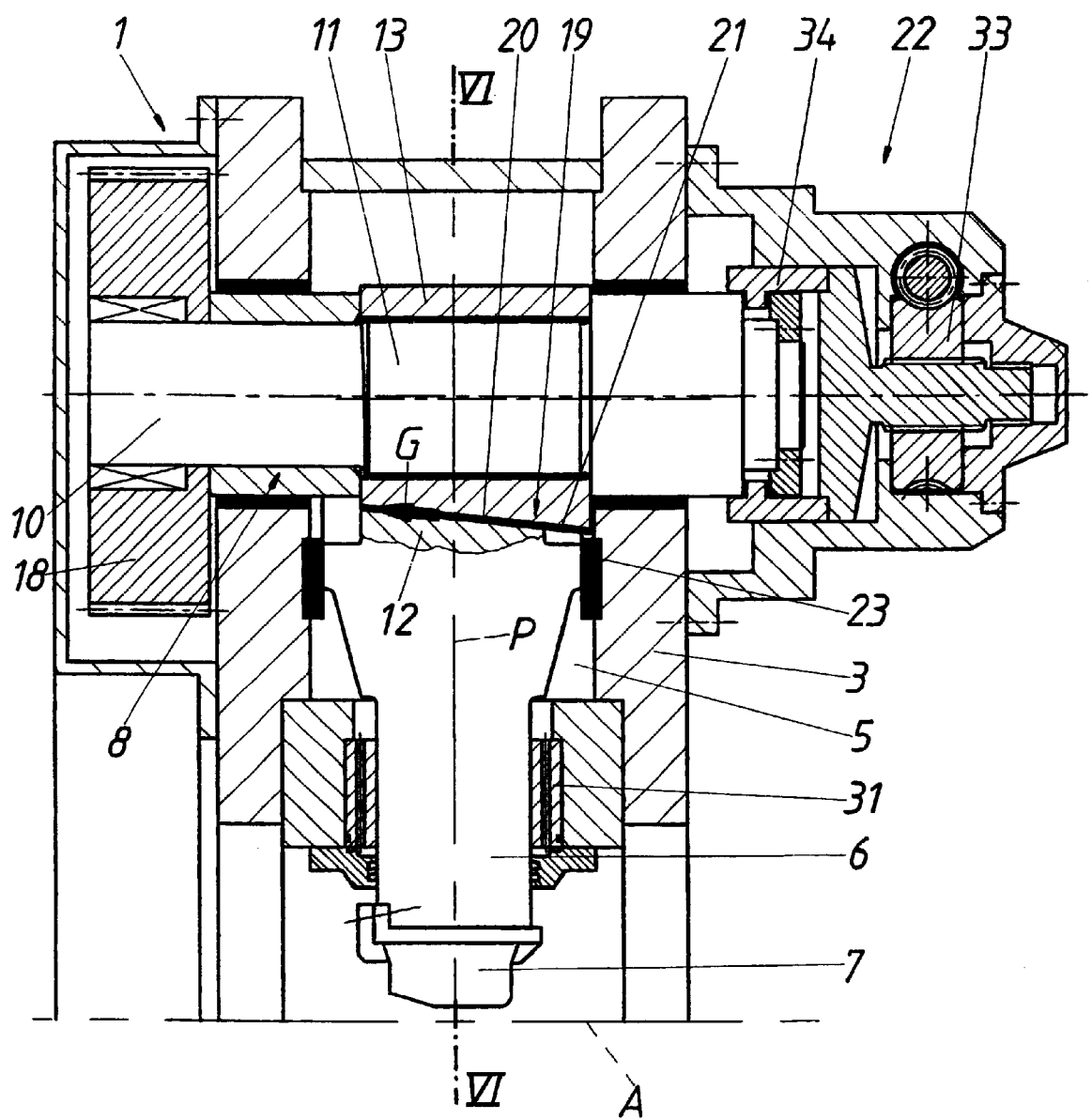
FIGS. 5 and 6 represent a further embodiment of the forging machine in an axial section along line V—V of FIG. 6 and in a cross-section along line VI—VI of FIG. 5 on a smaller scale.
Figure 6:
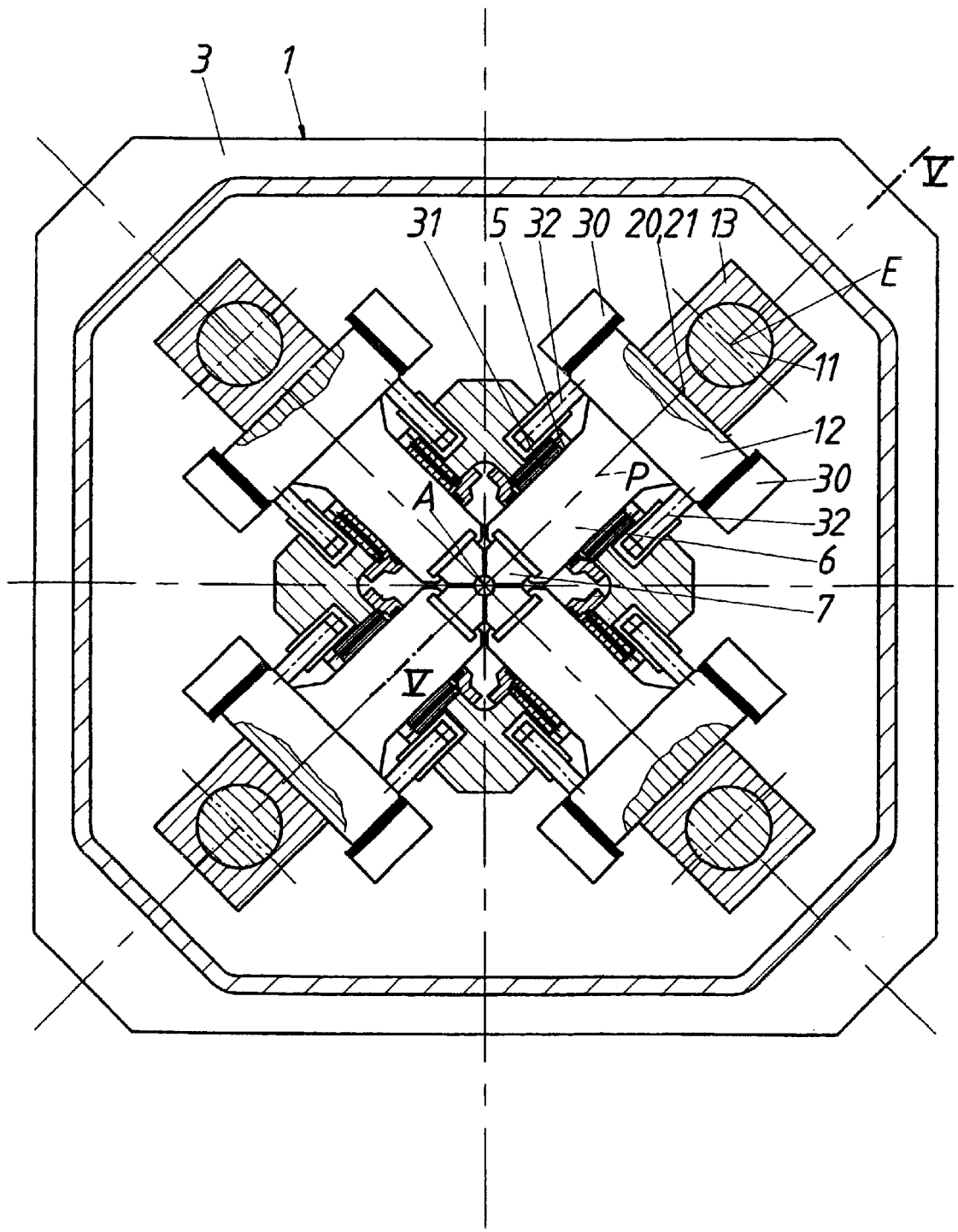

The embodiment shown in FIGS. 5 and 6 is a further, similar forging machine 1 where the same parts are again provided with the same reference numerals. In this case, the forging box 3 is standing still, and between the connecting rod head 12 and the bearing body 13 resembling a sliding pad there is merely a frictional connection. For this purpose, the connecting rods 6 seated in slide bars 30, 31 are urged against the bearing bodies 13 by compression springs 32, and the sliding surfaces 20 are urged against the inclined surfaces 21, so that the rotation of the eccentric effects the stroke movement of the connecting rods by the cooperation of bearing body 13 and connecting rod head 12. The adjustment of the stroke is likewise effected by means of a stroke adjusting means 12, which comprises an inclined sliding path G formed by the sliding surface 20 of the connecting rod head and the associated inclined surface 21 of the bearing bodies 13. For displacing the bearing bodies 13, there are, however, individual actuators 22 each associated to the eccentric shafts 10, which actuators axially move the eccentric shafts 12 by a screw drive 33 and entrainment elements 34 rotatably, but axially immovably engaging in the eccentric shaft ends, and thus change the stroke of the forging punches 6 as required.

What is claimed is:

1. A forging machine comprising
   (a) a forging box,
   (b) a plurality of connecting rods, each connecting rod having an axis and carrying a forging tool at one end thereof,
   (c) an eccentric drive for driving each connecting rod in a reciprocating motion, the drive including
      (1) a shaft having an axis and comprising an eccentric, the reciprocating motion extending radially to the eccentric shaft axis and the connecting rod being supported against axial displacement,
      (2) a bearing body rotatably and axially displaceably mounted on the eccentric, and
      (3) a head at an end of the connecting rod opposite to the one end,
      (4) the bearing body and the connecting rod head having corresponding inclined surfaces in non-rotating and sliding engagement to form a sliding path which is inclined to the axis of the shaft and extends in a plane extending perpendicularly to a plane defined by the axes of the connecting rod and the shaft, and
   (d) an actuator for axially displacing the bearing body.

2. The forging machine of claim 1, wherein the bearing body is non-displaceably seated on the eccentric, the shaft is axially displaceable, and the actuator engages the shaft.

3. The forging machine of claim 1, wherein the connecting rod head defines a connecting link guide, and the bearing body is a sliding pad received in the connecting link guide with a transverse clearance.

4. The forging machine of claim 1, wherein the forging box is mounted in a machine frame for rotation about a forging axis extending parallel to the axis of the shaft.

5. The forging machine of claim 4, wherein the actuator is common for all eccentric drives and comprises a screw drive including an adjusting nut mounted on the forging box coaxially with the forging axis, the adjusting nut being non-rotatable but displaceable and having an entrainment element in non-displaceable but rotatable engagement with the shafts, and a drivable gear rim meshing with the adjusting nut.

* * * * *